United States Patent [19]
Brockschmidt

[11] Patent Number: 6,076,643
[45] Date of Patent: Jun. 20, 2000

[54] FLUID-DRIVEN CLUTCH

[75] Inventor: Detlev Brockschmidt, Harsewinkel, Germany

[73] Assignee: Claas Industrietechnik GmbH, Paderborn, Germany

[21] Appl. No.: 09/258,960

[22] Filed: Mar. 1, 1999

[30] Foreign Application Priority Data

Mar. 3, 1998 [DE] Germany ............................ 198 08 855

[51] Int. Cl.[7] ............................ F16D 25/061; F16D 25/10
[52] U.S. Cl. ........................ 192/48.91; 192/86; 192/87.17
[58] Field of Search ............................ 192/48.91, 87.17, 192/86, 85 A, 53.361; 92/168; 277/435

[56] References Cited

U.S. PATENT DOCUMENTS

| | | | |
|---|---|---|---|
| 2,253,578 | 8/1941 | Peterson et al. | 192/53.361 |
| 3,098,550 | 7/1963 | Schwab | 192/87.17 |
| 3,106,999 | 10/1963 | Snoy | 192/87.17 |
| 3,199,648 | 8/1965 | Schwab | 192/87.17 |
| 4,153,148 | 5/1979 | Malinowski | 192/87.17 |
| 5,035,310 | 7/1991 | Meyerle et al. | 192/85 A X |
| 5,343,993 | 9/1994 | Soffa | 192/53.361 X |

FOREIGN PATENT DOCUMENTS

| | | | |
|---|---|---|---|
| 1 301 715 | 8/1969 | Germany | F16H 7/08 |
| 1 575 801 | 11/1969 | Germany | F16D 25/063 |
| 1 600 150 | 1/1970 | Germany | F16D 25/063 |
| 27 20 679 | 11/1978 | Germany | F16D 9/00 |
| 29 31 953 | 2/1980 | Germany | F01P 7/04 |
| 25 40 191 | 12/1980 | Germany | F16D 25/063 |
| 82 12 551 | 10/1982 | Germany | F16D 25/063 |
| 35 07 302 A1 | 10/1985 | Germany | B60K 17/02 |
| 37 00 813 A1 | 2/1988 | Germany | F16D 25/10 |
| 1 603 595 | 11/1981 | United Kingdom | F16D 23/12 |
| WO 91/03659 | 9/1989 | WIPO | F16D 25/061 |

*Primary Examiner*—Rodney H. Bonck
*Attorney, Agent, or Firm*—Husch & Eppenberger, LLC; Robert E. Muir

[57] ABSTRACT

The invention relates to a fluid-driven clutch in which a non-rotatable clutch ring is axially slidable on a shaft via a fluid introduced into a pressure chamber for transmission of the driving force through a tooth system engaged with a corresponding clutch ring having a corresponding tooth system. The seals for sealing the pressure chamber are arranged in such a way that they are not permanently in contact with the wall of the pressure chamber to be sealed. This ensures that the seals do not impair the mobility of the axially lidable clutch ring.

16 Claims, 1 Drawing Sheet

FLUID-DRIVEN CLUTCH

BACKGROUND OF THE INVENTION

This invention relates generally to couplings and more particularly to improvements in fluid-driven clutches.

A non-rotatable clutch ring is axially slidable on a shaft via a fluid introduced into a pressure chamber for transmission of the driving force through a tooth system engaged with a corresponding clutch ring having a corresponding tooth system.

A fluid-driven clutch is known from EP 0 276 255. In this are shown two controllable single clutches for a gear system which can be infinitely variably shifted under load, which clutches can be moved by a fluid into an engaged position The clutches are designed as form-locking positive denture clutches in the special form of crown gearing in which the tooth profiles of the parts to be coupled are arranged in the axial direction. Due to the axially arranged teeth, the shift distance of the parts to be coupled can be kept very short, as the specific pressure at the teeth can be kept low by the high surface area ratio of the teeth. However, the previously known sealing of the pressure chamber proved to be a drawback. The radially arranged sealing elements due to their initial tension cause unwanted additional axial friction forces when the clutch is moved. These friction forces can be determined in advance only with difficulty and are variable over the life of the clutch. Depending on the design of the flank angle of the tooth profiles, the additional axial friction force can cause the clutch to no longer uncouple automatically and to stick. A larger angle of the crown gearing can solve the problem, but the drawback arises that then the retaining force generated by the fluid must be very strong, in turn with correspondingly generously proportioned components, as a result of which the gain of space due to the crown gearing is quickly lost.

SUMMARY OF THE INVENTION

It is an object of the present invention to provide a fluid-driven clutch which overcomes one or more of the problems described above.

Another object is to provide a ball/spring latch system used for centering and for accelerated uncoupling of a driver.

These, and other objects and advantages of the present invention, will become apparent as the same becomes better understood from the detailed description when taken in conjunction with the accompanying drawings.

In accordance with one aspect of the present invention there is provided a fluid-driven clutch including a shaft, a clutch ring on the shaft and having a tooth system, a corresponding ring on the shaft adjacent the clutch ring and having a corresponding tooth system, a pressure chamber associated with the clutch ring and having a wall, means for introducing fluid under pressure into the pressure chamber to axially slide the clutch ring on the shaft into engagement with the corresponding ring for transmission of a driving force through the tooth systems, sealing means for sealing the pressure chamber and so constructed and arranged that said seals and the wall of the pressure chamber are movable relative to each other when the fluid under pressure is introduced.

The seals for sealing the pressure chamber are arranged in such a way that they are not permanently in contact with the wall of the pressure chamber to be sealed. The solution according to the invention can also lie in that a movable seal during a coupling operation can be placed on an adjacent wall and/or a movable wall can be placed on a seal. With such an arrangement of sealing elements, additional friction forces in the clutch are avoided, the crown gearing can be given a desirable favorable tooth angle, automatic uncoupling remains invariably reliable and the dimensions of the clutches can be kept very small.

BRIEF DESCRIPTION OF THE DRAWING

Reference is now made more particularly to the drawing which illustrate the best presently known mode of carrying out the invention and wherein similar reference characters indicate the same parts throughout the view.

DETAILED DESCRIPTION

Figure 1:
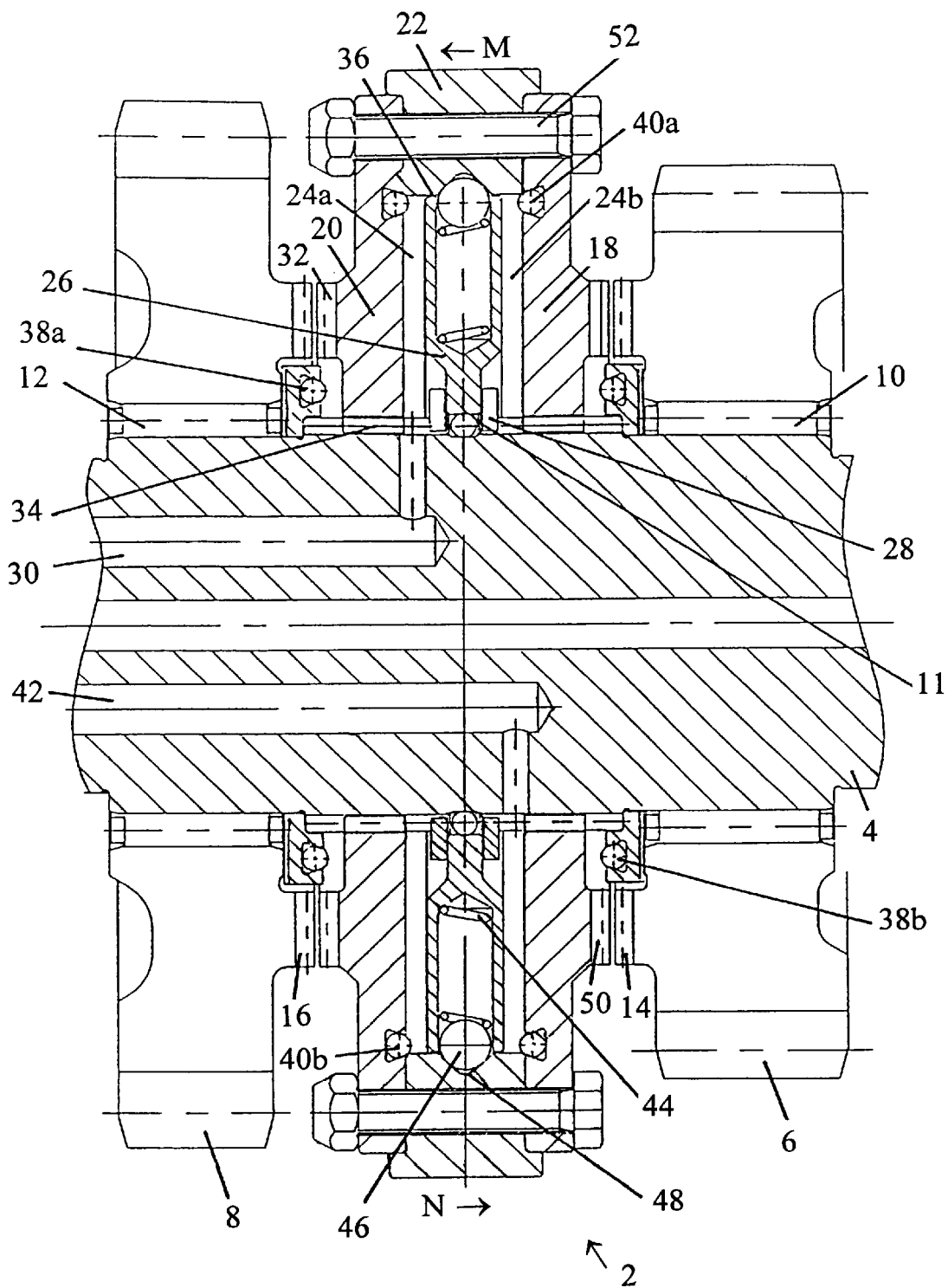
FIG. 1 is a cross-sectional view of one embodiment of the invention.

The invention will now be described with the aid of a practical example. In FIG. 1 can be seen a cross-section through a fluid-driven coupling or clutch 2 shown in the form of a twin clutch. The elements to be shifted on the shaft 4 are the gears 6, 8 as loose wheels which are arranged rotatably on the shaft 4 by bearings 10, 12. On one side of the gears 6, 8 are mounted axially arranged teeth 14, 16. Between the two gears 6, 8 is arranged the actual clutch 2. This essentially consists of a driver which is preferably arranged non-rotatably by a tooth system, but axially slidably on the shaft 4. The driver is essentially formed by the clutch rings 18, 20 and the locking ring 22. The driver 18, 20, 22 encompasses the pressure chambers 24a, 24b as well as a pressure ring 26 which is located therein and supported on the shaft 4 and which is arranged axially non-slidably on the shaft 4 with shaft locking rings 28. The pressure chamber 24a is therefore laterally surrounded by the shaft 4, the pressure ring 26, the locking ring 22 and the clutch ring 20, while the pressure chamber 24b is surrounded by the shaft 4, the pressure ring 26, the locking ring 22 and the clutch ring 18. The walls of the pressure chambers 24a and 24b and the clutch rings 18 and 20 along with the locking ring 22 are movable relative to each other; however, the preferred apparatus is described below.

The clutch must be operated in order to transmit a driving force to one of the gears 6, 8. This is done by conducting a fluid into a pressure chamber 24a, 24b. If for example the gear 8 is to be connected, fluid must pass into the pressure chamber 24a. Shifting takes place preferably when the speeds of the shaft 4 and the gear 8 are at least close. To connect the gear 8, a fluid is passed through the channel 30 into the pressure chamber 24a. The driver 18, 20, 22 moves on account of the pressure building up in the pressure chamber 24a and the hydrostatically operating fluid in the direction of the arrow M, and the tooth systems 16, 32 become engaged with each other. During the movement of the driver 18, 20, 22 the pressure chamber 24a is however not completely sealed, leaking oil can escape from the pressure chamber 24a through the short tooth system 34 and the gap 36. First, therefore, the quantity of fluid supplied must be greater than the quantities of leaking oil escaping through the gaps and tooth systems. In addition the quantity of fluid supplied must be sufficient to be able to fill the growing pressure chamber 24a with fluid. The depth of the tooth profile and the stroke distance which the driver 18, 20, 22 must cover in order to bring the tooth systems 16, 32 reliably into engagement with each other should advantageously be coordinated with each other so that the driver 18, 20, 22 almost reaches its end stop when the tooth profiles are enmeshed with each other with sufficient reliability for transmission of driving power. For short shift distances, easy engagement and disengagement of the respective gears, high transmissible torques and little shift noise, it is advantageous if the tooth systems 16, 32 are constructed as crown gearing whose flanks show a trapezoidal tooth system comprising a force-repelling component. Such a tooth system is released automatically when the pressure chamber 24a, 24b is shifted without pressure. Only now, with sufficiently deep teeth of the tooth systems 16, 32 in the region of the end stop of the driver 18, 20, 22, is the outer surface of the clutch ring 20 pressed against the seal 38a, and the seal 40a located on the inside of the clutch ring 18 seals the gap 36. Hence the pressure chamber 24a is almost completely sealed. The seals 38a, 38b, 40a, 40b are arranged in suitably shaped grooves, for example dovetail grooves, in which they can be locked with a corresponding cross-sectional shape. The seals 38a, 38b, 40a, 40b should preferably be made of resilient material.

Manufacturing tolerances which could lead to an uneven percentage contact area of the sealing rings 38a, 40a are taken up by a correspondingly large axial clearance between the pressure ring 26 and the shaft locking rings 28. Between the pressure ring 26 and the shaft 4 can additionally be arranged a seal 11 which seals the pressure ring 26 against losses of leaking oil in spite of the clearance with which it is mounted.

If the gear 6 is to be connected, channel 42 admits fluid. The manner of operation is similar to the manner of operation described above, but with the difference that now the driver 18, 20, 22 moves in direction N and finally the seals 38b, 40b seal the pressure chamber 24b and the tooth systems 14, 50 mesh with each other.

If no gear is to be connected, the channels 30, 42 are without pressure. By a latch system consisting of springs 44 and balls 46 which can latch in a groove 48 extending around the inside of the locking ring 22, a reliable neutral position of the clutch 2 is obtained. This ball/spring system also assists rapid uncoupling of a coupled gear 6, 8 during pressureless shifting of the clutch.

When the clutch 2 is designed as a dual clutch, it is advantageous if the driver 18, 20, 22 for reasons of simplifying manufacture consists of two identical parts 18, 20, these together with the locking ring 22 being held together by bolts 52 or fastening means of comparable effect.

The above description with the aid of an embodiment is meant only as an example. On no account is it confined to a dual clutch, but can also be employed correspondingly with single clutches. Also one skilled in the art is capable of modifying the invention with the aid of the technical information known in the art.

In the claims:

1. A fluid-driven clutch comprising: a shaft, a clutch ring on the shaft and having a tooth system, a corresponding ring on the shaft adjacent the clutch ring and having a corresponding tooth system, a pressure chamber associated with the clutch ring and having a wall, means for introducing fluid under pressure into the pressure chamber to axially slide the clutch ring on the shaft into engagement with the corresponding ring for transmission of a driving force through the tooth systems, and sealing means for sealing the pressure chamber and so constructed and arranged that said sealing means and the wall of the pressure chamber are movable relative to each other when the fluid under pressure is introduced.

2. A fluid-driven clutch according to claim 1 wherein the sealing means comprises seals arranged in such a way that they removably contact the wall of the pressure chamber.

3. A fluid-driven clutch according to claim 1 wherein the seals during a coupling operation contact an adjacent wall.

4. A fluid-driven clutch according to claim 1 wherein the seals during a coupling operation contact a movable wall.

5. A fluid-driven clutch according to claim 1 wherein the seals are arranged in grooves in in which the seals are able to be locked with a corresponding cross-sectional shape.

6. A fluid-driven clutch according to claim 1 wherein the seals are made of resilient material.

7. A fluid-driven clutch according to claim 1 further comprising a pressure ring mounted on the shaft with a clearance.

8. A fluid-driven clutch according claim 7 further comprising an additional seal between the pressure ring and the shaft.

9. A fluid-driven clutch according to claim 1 wherein driving torque is transmitted by tooth systems from the shaft to the clutch ring and the corresponding ring.

10. A fluid-driven clutch according to claim 1 further comprising at least one tooth system constructed as crown gearing which transmits driving torque to connected gears.

11. A fluid-driven clutch according to claim 1 further comprising at least one substantially identical additional clutch ring.

12. A fluid-driven clutch according to claim 1 wherein the clutch ring is fastened to a locking ring .

13. A clutch according to claim 1 further comprising a ball/spring latch system used for centering and for accelerated uncoupling of a driver.

14. A fluid-driven clutch in accordance with claim 1 wherein the means for introducing fluid include at least two channels, said channels being without pressure when no gear is to be connected.

15. A fluid-driven clutch in which a clutch ring is axially slidable on a shaft by a fluid which is introduced into a pressure chamber for engagement with a tooth system for transmission of a driving force via a corresponding clutch ring with corresponding tooth system, characterized in that sealing means for sealing the pressure chamber are arranged in such a way that they removably contact the wall of the pressure chamber to be sealed during operation of the clutch.

16. A fluid-driven clutch comprising: a shaft, a clutch ring on the shaft and having a tooth system, a corresponding ring on the shaft adjacent the clutch ring and having a corresponding tooth system, a pressure chamber associated with the clutch ring and having a wall, means for introducing fluid under pressure into the pressure chamber to axially slide the clutch ring on the shaft into engagement with the corresponding ring for transmission of a driving force through the tooth systems, and sealing means for sealing the pressure chamber and so constructed and arranged that said sealing means and the wall of the pressure chamber are able alternatively to contact and release from contact during operation of the clutch.

* * * * *